Figure 3:
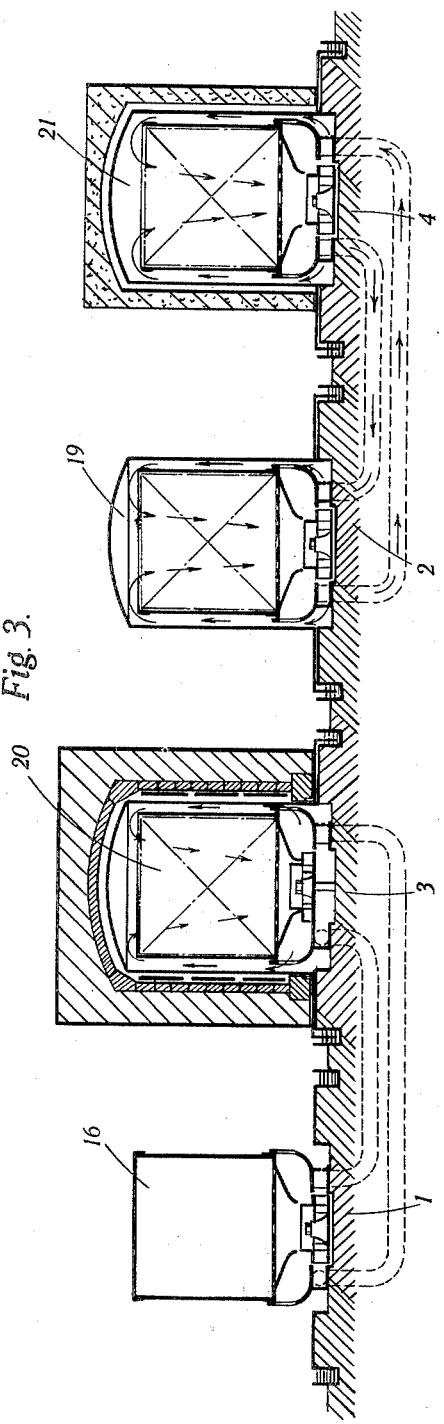

March 11, 1941. J. MacDONALD 2,234,871
FURNACE
Filed April 7, 1938  4 Sheets-Sheet 1
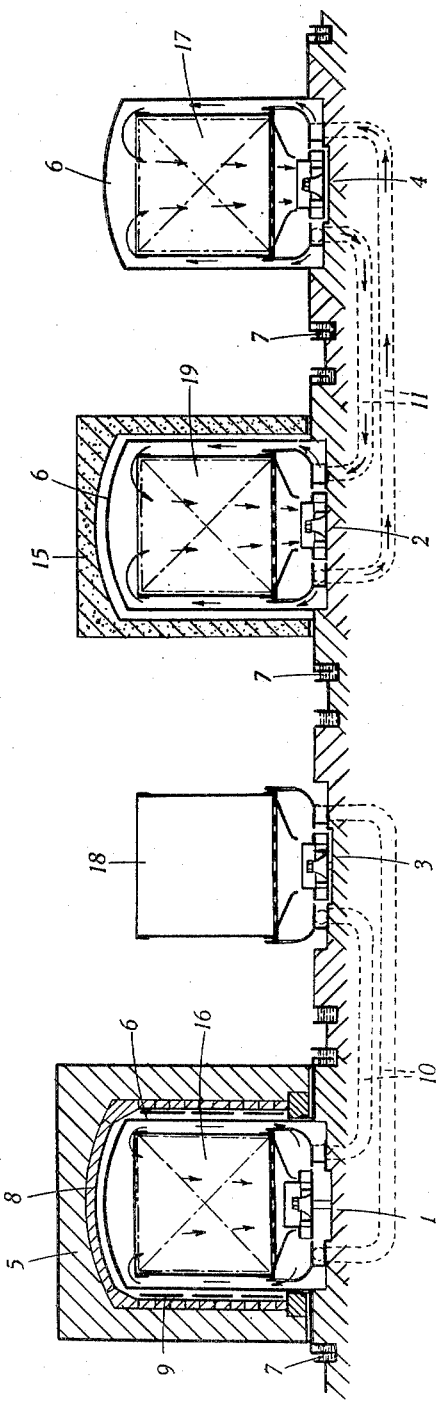
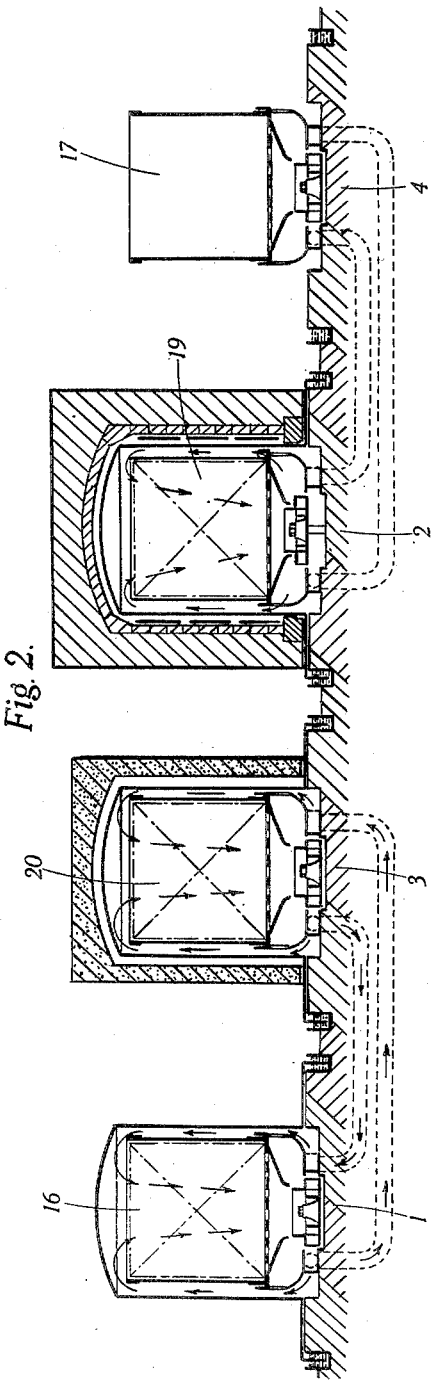
James MacDonald INVENTOR
BY
ATTORNEY March 11, 1941. J. MacDONALD 2,234,871
FURNACE
Filed April 7, 1938 4 Sheets-Sheet 2

James MacDonald INVENTOR
BY
ATTORNEY

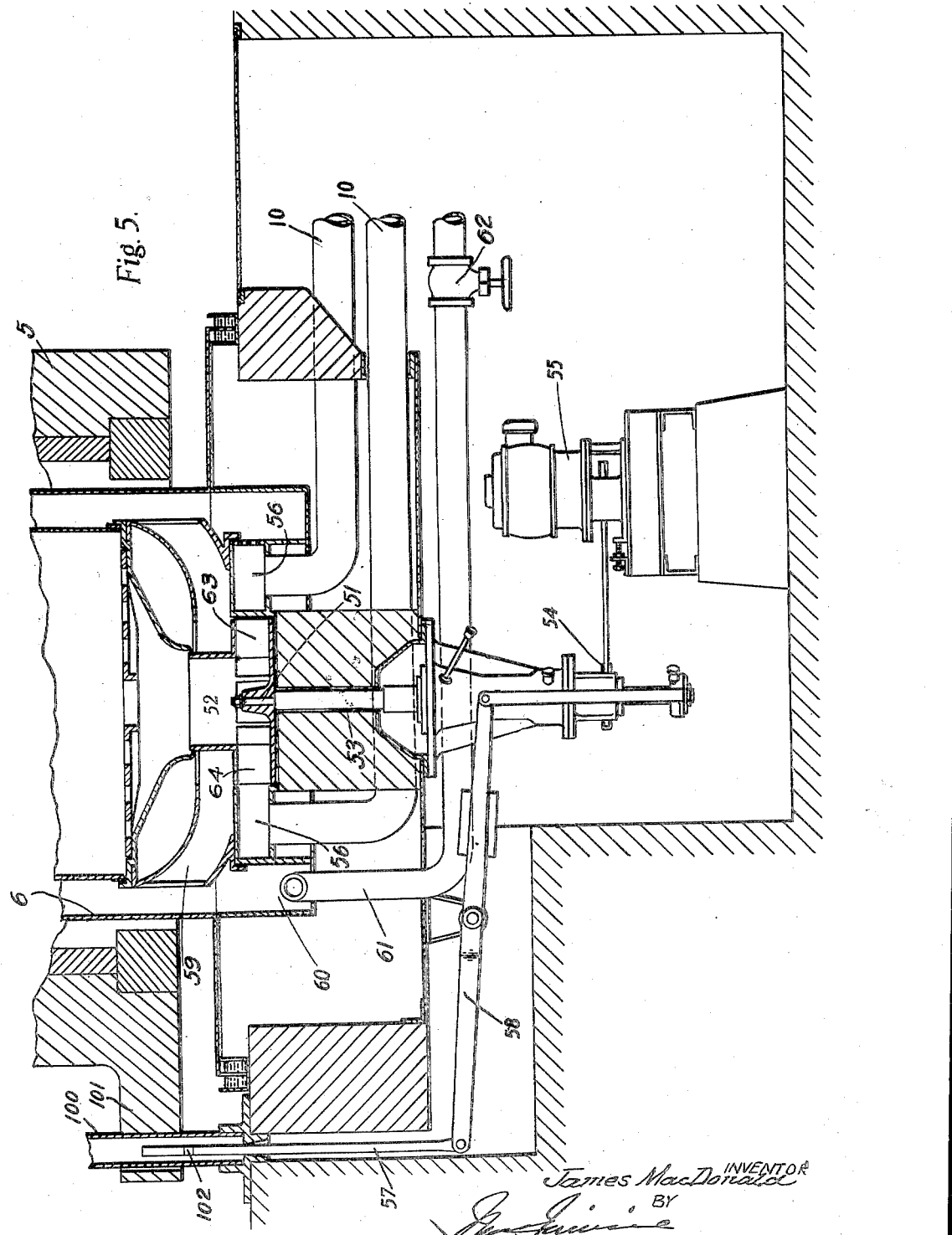

March 11, 1941.   J. MacDONALD   2,234,871
FURNACE
Filed April 7, 1938    4 Sheets-Sheet 4
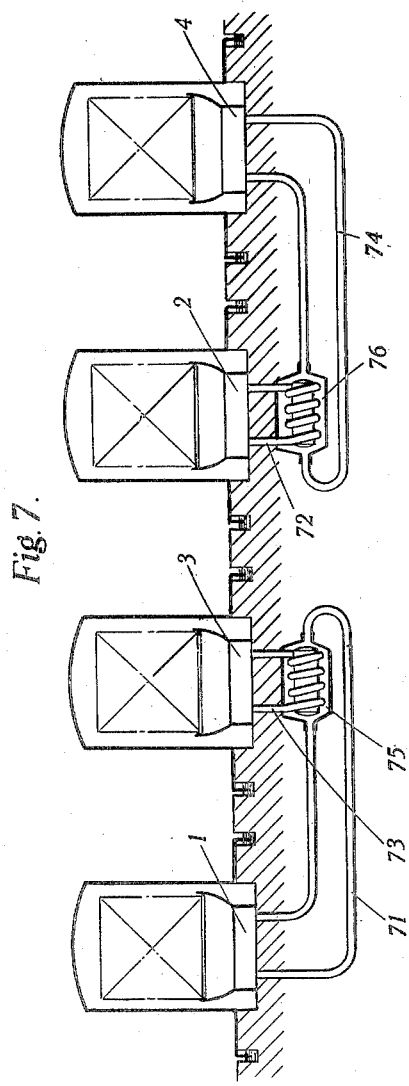
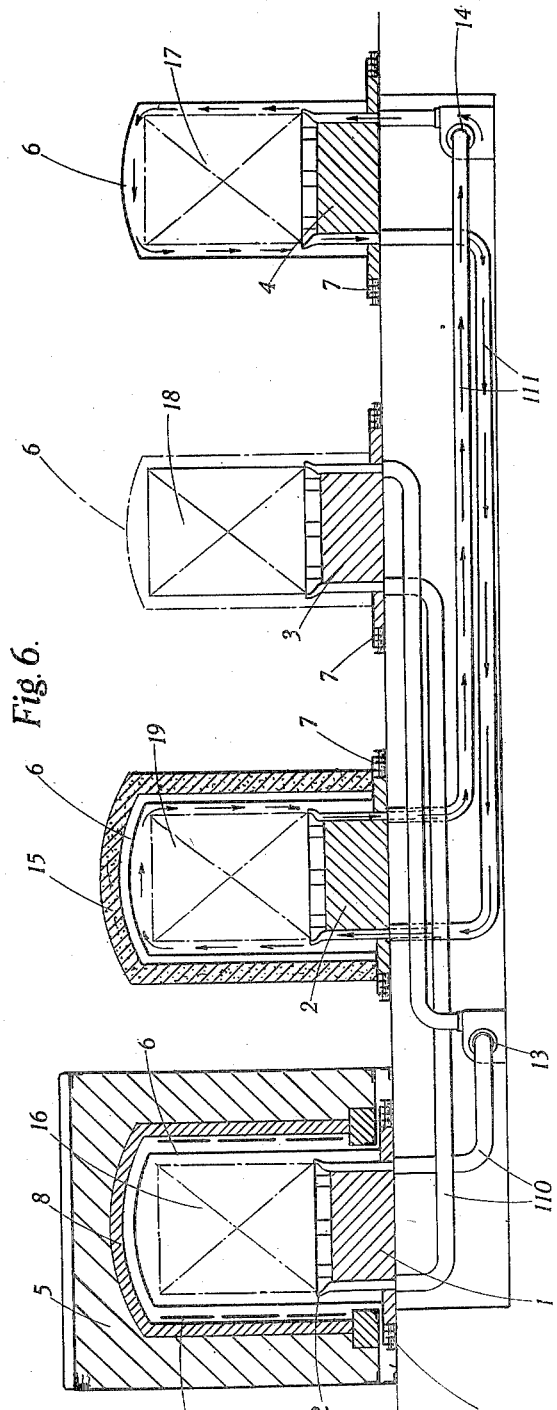
James MacDonald INVENTOR
BY
ATTORNEY Patented Mar. 11, 1941

2,234,871

UNITED STATES PATENT OFFICE 2,234,871

FURNACE

James MacDonald, London, England, assignor of one-half to G. W. B. Electric Furnaces Limited, London, England Application April 7, 1938, Serial No. 200,761
In Great Britain April 15, 1937

14 Claims. (Cl. 266—5)

This invention relates to furnace arrangements in which a furnace is used in combination with a number of bases for the heat-treatment of charges of material or of articles and also to means in themselves of wide application, for affording alternative paths for gases. The term base throughout this specification and claims designates a structure formed to receive a charge to be treated and to receive a transportable furnace operable to heat the charge.

In a furnace arrangement to which the invention relates, the charge is positioned on one of the bases and is heated by the furnace whilst other charges are cooling on the other bases, the furnace being shifted to the bases in succession so that the charge on each base is first heated by the furnace and then allowed to cool. Whilst the charge on one base is being heated, the cooled charge on the next base to receive the furnace is removed, a fresh charge positioned and preferably a protective atmosphere established around the charge which for this purpose may be enclosed in a bell.

An object of the invention is to provide in a battery of this kind for the preheating of the fresh charge, by the heat stored in a charge of which the heat-treatment has been completed and which is being allowed to cool, whilst the charges remain in position on the bases.

Another object of the invention is to provide in a battery of this kind, means for circulating gases around a heated charge and around the fresh charge so that heat is transferred from the heated charge to the fresh charge, thereby increasing the rate of cooling of the heated charge and preheating the fresh charge.

In a specific form the invention provides a battery having a number of bases, each base in succession receiving a charge which is heated by a bell-type furnace and then allowed to cool on the base, in which the bases are interconnected by means permitting the circulation of gases from the cooling charge to the preheating charge.

The circulating gases may be those forming a protective atmosphere for the charge, in which case, they come into intimate contact with the charge. The gases may however be circulated around the outside of the bells enclosing the protective atmosphere and in this case may be air.

Preferably the base containing the fresh charge is covered during the preheating with a removable bell covered with insulating material to prevent loss of heat and a similar lagged bell may also surround the base containing the heated charge.

Another object of the invention is to provide in a furnace (for example one in which the protective atmosphere is circulated within the retort during the heating), improved means for affording alternative paths for gases.

The present invention enables the desired change to be carried out by making provision for shifting a circulating fan to co-operate with appropriate scrolls or ducts or delivery areas in each position, so that it can be caused to deliver into any of the desired paths; alternatively or additionally the suction side of the fan can be similarly caused to draw the gases from different areas.

While the invention is of wide application to furnaces in which movement of air or other gases is effected by fans, it is especially applicable to recuperative cycles in which the material is contained in retorts and heat from a cooling charge is utilized for preheating the charge in another retort.

The present invention carries out the desired change in the circuit of the circulating gases as regards each retort by shifting the fan axially so that it cooperates with the appropriate ducts in each positon. The shifting of the fan to the appropriate position may be effected automatically and simultaneously with change in the relative arrangement of furnace and base during the recuperative cycle; for example, when a bell-type furnace is placed over any one of a battery of bases which are being used in a recuperative cycle, it may automatically cause the fan in that base to move to a position in which it effects internal circulation within a retort on that base.

Various other objects of the invention will appear from the following description of particular embodiments of the invention in which reference is made to the accompanying drawings, the novel features being pointed out in the appended claims.

In the drawings:

Figs. 1 to 4 represent diagrammatically the arrangement at successive stages in the cycle of operations, Fig. 5 represents in cross-section a base embodying improved means for affording alternative paths for gases, Fig. 6 represents another form of the arrangement and Fig. 7 is a diagrammatic representation of a further modification.

As shown four bases 1, 2, 3 and 4 and a bell-type furnace 5 are provided for the battery. Retorts 6 are provided, one retort for each base, the retort 6 covering the base and being sealed at the bottom by a seal 7 surrounding the furnace base and comprising a flange on the retort dipping into a trough of liquid. Means are also provided at each base for establishing a protective atmosphere within the retort by pipe connections such as the pipe 61 shown in Fig. 5 leading to a gas supply (which may be of conventional design and which is therefore not shown) and having control valves such as the valve 62 shown in Fig. 5 operable at the will of the attendant.

The furnace 5 comprises an inverted pot-shaped casing 8 suitably lagged and having electric heating elements 9 on its inner walls. These elements are connected to a suitable source of supply through a flexible lead. The furnace may be placed over the retort 6 on any one of the bases 1, 2, 3 or 4 and then heats the charge on that base.

The bases are connected together in pairs by pipe connections which open at each end into the bases.

In the apparatus illustrated in which there are four bases, there will be two pipe systems 10, 11. Each base will be connected to that base which receives the furnace next but one in the cycle of operations.

In the form shown in Figs. 1 to 4, the furnace is placed on the bases in the order 1, 2, 3, 4, and the adjacent bases 1, 3 are connected by the pipe system 10 and the adjacent bases 2, 4 are connected by the pipe system 11. In this form, the bases are each provided with the improved means for affording alternative paths for the gases which are shown to a larger scale in Fig. 5.

In each base a centrifugal fan 51 is arranged with its axis vertical. This fan has blades 63 within a scroll casing 64 and a cylindrical portion 52 of this casing surrounding the inlet to the fan extends upwardly by about the height of the blades 63. The fan (including the casing 64) and its driving shaft 53 (which may be driven through splines or the equivalent and gearing 54 from the motor 55) are together movable in an axial direction from a lower position to an upper position and vice versa.

At the lower position, the scroll casing 64 is aligned with ducts 56 formed in the base and connected by a pipe of the pipe system 10 or 11 (set Fig. 1) to another base. A circular channel 60 is connected by the other pipe of the pipe system 10 or 11 to this other base, and this channel 60 communicates with the inside of a retort 6 placed on the base.

At the upper position, the casing 64 is aligned with ducts 59 which lead into the retort. When the fan is in the lower position, these ducts 59 are obturated by the portion 52 of the casing 64.

When the retort 6 over any base is taking part in a recuperative stage (that is either being preheated or preheating a fresh charge) the fan 51 is in the lower position. The fans in the bases taking part in the recuperative stages are then working in series circulating the gases through both charges. The gases are led by one of the pipes 10 or 11 to the channel 60 in the base and distributed by it around the inside of the retort 6. The gases then pass downwardly to the inlet of the fan and are distributed by the fan to the ducts 56 from whence they return by the other pipe of the pipe system 10 or 11 to the other base. When the fan is in the upper position, the gas from the retort is blown directly into the duct 59 which diverts the flow upwards for internal circulation.

When the bell furnace is placed over a base its weight acts through a lever arrangement 57, 58 automatically to raise the shaft 53 and fan 51. The lever arrangement includes a vertically disposed lever 57 which passes up a tube 100 which acts as a guide for one of the lugs 101 on the furnace as is common practice. A cross bar 102 on the lever 57 projects through a slot in the tube 100 so that when the furnace is placed over the base, the lug 101 engages the bar 102 and the furnace weight bearing on the rod 57 raises the fan 51 to the upper position. It will be seen that the fan lifting device on each of the common bases, is operated automatically by the furnace as it descends over the charge retort to be heated, thus making it impossible to regulate the flow of gas in any but the desired direction.

A lagged bell 15 is provided for the battery of sufficient size to cover completely the protective retorts 6. This bell 15 is placed over the base containing the fresh charge and prevents undue loss of heat during the preheating of this charge. A bell (which is identically similar to the bell 15 and which is not therefore separately shown) may also be provided to cover the base containing the charge which has just been heated.

The method of operating the battery just described will be clear from a consideration of one cycle of operations. At the point in the cycle represented in Fig. 1, the furnace 5 has been placed on the base 1 and is beginning to heat the charge 16 already placed thereon. The base 4 from which the furnace 5 has just been removed carries a hot charge 17 which is beginning to cool. Another base 3 carries a charge 18 which has already been cooled somewhat and the remaining base 2 carries a cold charge 19. The charges on all the bases are surrounded by a protective atmosphere within the double sealed protective retorts 6 and this atmosphere is maintained during the cycle.

The lagged bell 15 has been placed over the outside of the protective retort 6 covering the base 2 containing the cold charge 19 which retort has previously been scavenged by the gas supplied through the pipe 61 and forming the protective atmosphere.

The fan 51 in the base 1 has been raised by the weight of the furnace 5 and is circulating the protective atmosphere within its associated retort 6 in the direction shown by the arrows. The fans 51 in the bases 2, 3 and 4 are in their lower position, the fan in the base 3 being stopped.

The fans in the bases 2 and 4 act in series to circulate the protective atmosphere in the corresponding retorts through the pipes 11 and the retorts in the direction shown by the arrows. The heat given off by the hot charge 17 is thus transferred to the cold charge 19 which is gradually heated until a balance of temperature between those two charges is established. The arrangement is preferably designed so that this balance is obtained during the time taken by the furnace 5 to complete the heating of the charge 16 on which it is placed.

Shortly before the end of this period, the charge 18 which has already cooled is removed from its base 3 and a fresh charge 20 placed thereon. The protective retort 6 is placed over the charge 20 and is flushed thoroughly with the protective gases thereby establishing the required atmosphere. The supply of protective gases is then reduced to that required just to maintain the atmosphere.

At the end of the heating period the lagged bell 15 is transferred to this freshly charged base 3 and the furnace 5 is transferred from the base 1 on which it has been heating the charge 16 to the base 2 from which the lagged bell 15 has been removed and which contains the preheated charge 19.

The arrangement is then as shown in Fig. 2 and is similar to that at the beginning of the cycle. The fan 51 in the base 2 has been raised by the weight of the furnace 5 and is circulating the protective atmosphere around the charge 19, whilst the fans in the bases 1 and 3 are circulating the protective atmosphere through the pipes 10 and the corresponding retorts, thus transferring the heat of the hot charge 16 to the fresh charge 20.

Fig. 3 shows the arrangement after the end of the period during which the furnace is heating the charge 19 on the base 2. The completely cooled charge 17 on the base 4 has been removed and replaced by a fresh charge 21 which has been covered by the protective bell 15. The furnace 5 has been transferred to the base 3 and is heating the preheated charge 20 whilst the charge 16 is completing its cooling on the base 1. The fan 51 in the base 3 has been raised by the weight of the furnace 5 and is circulating the protective atmosphere around the charge 20 whilst the fans in the bases 2 and 4 are circulating the protective atmosphere through the pipes 11 and the corresponding retorts, thus transferring the heat of the hot charge 19 to the fresh charge 21.

Figure 4:
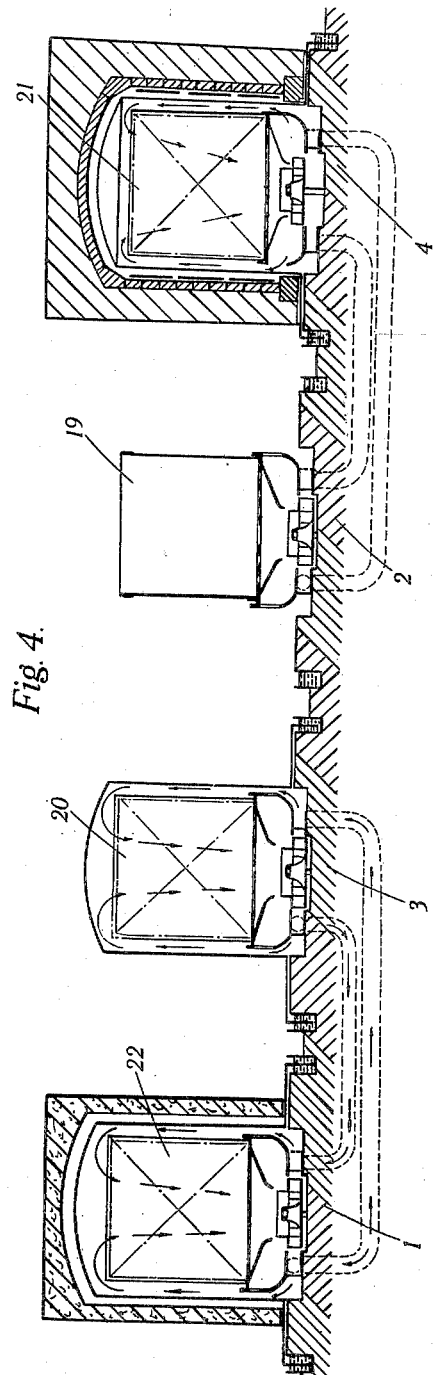

Fig. 4 shows the arrangement after the end of the period during which the furnace is heating the charge 20 on the base 3. The completely cooled charge 16 on the base 4 has been removed and replaced by a fresh charge 22 which has been covered by the protective bell 15. The furnace 5 has been transferred to the base 4 and is heating the preheated charge 21 whilst the charge 19 is completing its cooling on the base 2.

The fan 51 in the base 4 has been raised by the weight of the furnace 5 and is circulating the protective atmosphere around the charge 21 whilst the fans in the bases 1 and 3 are circulating the protective atmosphere through the pipes 12 and the corresponding retorts, thus transferring the heat of the hot charge 20 to the fresh charge 22.

At the end of the heating period of the arrangement represented in Fig. 4, the transfer of the furnace, and the protective bell and the change-over of the circulating system is as shown in Fig. 1.

It will be seen that each charge is first preheated for a given period of time, is heated by the furnace for a similar period, is cooled at a forced rate for a similar period and is finally cooled naturally for almost the same length of time. The preheating of the charge enables a substantial saving to be made in the furnace costs.

A modified form of the arrangement is shown in Fig. 6 which represents the modified form at a point in the cycle of operations corresponding to that represented by Fig. 1. In this form, the bases 1, 2, 3, 4 are arranged in order and the furnace is transferred from one base to the adjacent base, alternate bases 1 and 3 being connected by the circulating system 110 and the alternate bases 2 and 4 being connected by the system 111. The ends 112 of the pipes of each system are arranged for the appropriate base with their ends opening upwardly. In each system of pipe connections, a fan such as 13 or 14 is inserted so that gases in the two retorts at the ends of the pipe system can be circulated between the retorts.

As the furnace is moved from base to base, the fan in the appropriate pipe system is started to circulate the protective atmosphere from around the charge which has just been heated to around the fresh charge thus preheating the latter. The cycle of operations is similar to that described with reference to Figs. 1 to 4.

In the forms described, the pipes of the circulating system open within the protective bell since the use of the protective atmosphere for the preheating is preferred.

In the modification shown in Fig. 7, the transfer of heat is effected between the protective atmospheres from each retort. The gases from the retorts on each base 1, 2, 3, 4, are circulated through pipe systems 71, 72, 73, 74 respectively and these pipe systems are interconnected so that the hot gas leaving one of the bases may be used to preheat cold gas entering another base. The transfer of heat is effected in heat exchange apparatus 75, 76, one such apparatus being provided for each pair of bases. The cycle of operations as regards the charges on each base is similar to that previously described in relation to Figs. 1 to 4 and the bases may be provided with axially movable fans to provide selective circulation of the gas either within the retort on each base or through the pipe systems 71, 72, 73, 74 in a manner similar to that previously described with reference to Figs. 1 to 5.

It will be understood that the invention is not restricted to the details of the specific arrangement.

I claim:

1. A structure forming part of a furnace arrangement and having a plurality of sets of ducts, said sets providing alternate paths through which gas may be circulated, said structure having a passage formed therein communicating with the several sets of ducts, a fan movable axially within said passage to cause gas flow through a selected set of ducts, and means moving with the fan to obturate the remaining ducts.

2. A furnace arrangement comprising a single bell-type heating furnace, a plurality of bases arranged in two sets to receive charges of material to be treated, the furnace being applicable to each base in succession to enclose the charge, protective covers for the charges on the bases, means for circulating gases within the protective covers around the charges, ducts connecting the bases of each set, and means for circulating the gases in a closed circuit around the charges on two bases through the connecting ducts to transfer the heat stored in a charge cooling on one base of the set to a cold charge awaiting heat treatment on another base of that set.

3. A furnace arrangement comprising a bell-type furnace, four bases to receive the furnace, protective covers for charges on the bases, a pair of conduit systems each connecting two of the bases and opening into the protective covers thereon, and fans incorporated in each conduit system and operable to circulate gas in a closed circuit around a charge on one base, through the conduit system, around the charge on the other base and through the conduit system back to the first base.

4. A method of heat-treatment of charges which are to be heated and cooled in which four furnace bases are employed in two pairs to utilize one furnace in such sequence that during each heating period the charge carried by one base of one pair is being heated by the furnace, the other base of that pair is being charged or carries a charge which is finally cooling and the bases of the other pair carry charges which are being cooled and preheated respectively by the circulation between them of heat-transferring gas, at the end of each heating period the furnace is transferred to the base on which a charge has been preheated, the finally cooled charge is removed and a fresh charge placed on the base thus made vacant and a further heating period is commenced.

5. In a furnace structure, a base having a vertically disposed central passage and having lateral passages leading from said central passage at vertically spaced points along said central passage, a fan mounted in said central passage for movement vertically therein and including a casing having a central inlet communicating with the upper part of the central passage and lateral outlets communicable in the several positions of the fan with selected lateral passages, and means to move said fan vertically in the central passage.

6. In a furnace structure, a base having a vertically disposed central passage and having lateral passages leading from said central passage at vertically spaced points along said central passage, a fan mounted in said central passage for movement vertically therein and including a casing having a central inlet communicating with the upper part of the central passage and lateral outlets communicable in the several positions of the fan with selected lateral passages, a shaft supporting said fan and extending downwardly therefrom, means to rotate said shaft, an end bearing at the lower end of said shaft and supporting the shaft, a lever pivoted intermediate its ends below said base, link means connecting one end of the lever and the bearing, and a push rod extending upwardly from the other end of said lever.

7. A method of heat-treatment of charges which are to be heated and cooled in which four furnace bases are employed in two pairs to utilize one furnace base in such sequence that during each heating period the charge carried by one base of one pair is being heated by the furnace, the other base of that pair is being charged or carries a charge which is finally cooling and the bases of the other pair carry charges which are being cooled and preheated respectively by transference of heat from one charge to the other, at the end of each heating period the furnace is transferred to the base on which a charge has been preheated, the finally cooled charge is removed and a fresh charge placed on the base thus made vacant and a further heating period is commenced.

8. A method of heat-treatment of charges which are to be heated and cooled in which furnace bases are employed in two sets to utilize one furnace base in such sequence that during each heating period the charge carried by one base of a set is being heated by the furnace, another base of that set is being charged or carries a charge which is finally cooling and the bases of the other set carry charges which are being cooled and preheated by transference of heat from a hot charge to a cooler charge, at the end of each heating period the furnace is transferred to the base on which a charge has been preheated, the finally cooled charge is removed and a fresh charge placed on the base thus made vacant and a further heating period is commenced.

9. A furnace arrangement comprising a furnace, a plurality of bases to which the furnace can be applied in succession to heat a charge on the base, retorts enclosing charges placed on the bases, passages in each base through which the atmosphere in the corresponding retort can be circulated around the charge on the base, passages between the bases connecting the bases in pairs, these last-mentioned passages opening into the retorts enclosing charges on the bases which they connect so that the atmosphere in the retorts can be circulated in a closed circuit between the bases and a fan in each base movable to alternative positions in one of which it is operable to circulate the atmosphere of the retort within the retort on the corresponding base and on the other it is operable to circulate the atmosphere in the retorts through the passages connecting the bases in a closed circuit between the bases so connected.

10. A furnace arrangement comprising a furnace, a plurality of bases arranged in pairs, to which bases the furnace can be applied in succession, retorts enclosing charges placed on the bases, each of the bases having a passage therein opening into the retort, a duct leading from this passage to the retort, and a duct leading from this passage to the other base of the pair and opening into the retort therein, a fan mounted in the passage in each base, a casing surrounding the fan, and having a central opening communicating with the central passage and a circumferential opening around the fan blades, and means for moving the fan and the casing together axially along the central passage to align the circumferential opening in the casing selectively with the duct leading to the retort and the duct leading to the other base of the bar and to close the other of said ducts.

11. A furnace arrangement as in claim 10 in which the casing comprises a cylindrical projection surrounding the central opening in the casing which in one position of the fan obturates one of the ducts in the base.

12. A furnace arrangement comprising a furnace proper, a plurality of bases arranged in pairs, the furnace being designed to be applied in succession to the bases, retorts enclosing charges placed on the bases, each of the bases having a central passage therein opening into the retort, a duct leading from this passage to the retort, and a duct leading from this passage to the other base of the pair and opening into the retort therein, a fan mounted in the passage in each base, a lever system supporting the fan and operative to raise and lower the fan in the operation of the lever system, and means forming part of the lever system to be engaged by the furnace when placed on the base to cause the weight of the furnace to operate the lever system to raise the fan, the lever system permitting the fan to move to a relatively lower position in the absence of the furnace.

13. A structure forming part of a furnace arrangement in which there are alternate paths for the circulation of gases and in which there is provided a passage open at one end and leading by this open end to all of said paths, a plurality of ducts opening into the said passage at spaced intervals, each of said ducts leading to one of the alternate paths, a fan in said passage operable to cause movement of gas along the passage and means for moving the fan along the passage into positions in which it is aligned with any selected duct to cause circulation of gas through the path to which the selected duct leads, said means comprising a lever system by which the fan is supported operable by pressure on one end of the lever system to raise the fan to the selected position.

14. A furnace arrangement comprising a single bell-type heating furnace, a plurality of bases arranged in two sets to receive charges of material to be treated, the furnace being applicable to each base in succession to enclose the charge, protective covers for the charges on the bases, ducts connecting the bases of each set and means for circulating the gases in a closed circuit around the charges on two bases through the connecting ducts to transfer the heat stored in a charge cooling on one base of the set to a cold charge awaiting heat-treatment on another base of that set.

JAMES MacDONALD.